US008649928B2

(12) United States Patent
Crombez

(10) Patent No.: US 8,649,928 B2
(45) Date of Patent: *Feb. 11, 2014

(54) PLUG-IN ELECTRIC VEHICLE INTERLOCK

(71) Applicant: Ford Global Technologies, LLC, Dearborn, MI (US)

(72) Inventor: Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,572

(22) Filed: Nov. 20, 2012

(65) Prior Publication Data

US 2013/0079968 A1     Mar. 28, 2013

Related U.S. Application Data

(63) Continuation of application No. 12/795,289, filed on Jun. 7, 2010, now Pat. No. 8,346,423.

(51) Int. Cl.
   *B60L 9/00* (2006.01)
(52) U.S. Cl.
   USPC .......................................................... 701/22
(58) Field of Classification Search
   USPC .......................................................... 701/22
   See application file for complete search history.

(56) References Cited

U.S. PATENT DOCUMENTS

| 7,243,748 | B2 | 7/2007 | Seksaria et al. |
| 7,410,020 | B2 | 8/2008 | Kikuchi et al. |
| 8,346,423 | B2 * | 1/2013 | Crombez ........................ 701/22 |
| 2008/0185991 | A1 | 8/2008 | Harris et al. |
| 2008/0275600 | A1 | 11/2008 | Rask et al. |
| 2010/0194529 | A1 | 8/2010 | Yamamoto |
| 2010/0204865 | A1 | 8/2010 | Nakamura |
| 2010/0211340 | A1 | 8/2010 | Lowenthal et al. |

(Continued)

FOREIGN PATENT DOCUMENTS

| DE | 102010000280 A1 | 10/2010 |
| DE | 102010000322 A1 | 10/2010 |
| WO | 2006/124310 A2 | 11/2006 |
| WO | 2009/001086 A2 | 12/2008 |

OTHER PUBLICATIONS

Plugging In Your Volt: Not With Just Any Old Cord (http://www.hybridcars.com/technology/plugging-your-volt-not-just-any-old-cord-25203.html), Date of Publication: Oct. 28, 2008, pp. 1-4.

(Continued)

*Primary Examiner* — Hussein A. Elchanti
(74) *Attorney, Agent, or Firm* — David B. Kelley; Brooks Kushman P.C.

(57) ABSTRACT

To prevent damage of a vehicle or a cord set used to charge a plug-in electric vehicle when the vehicle is driven away while the cord set is attached, an interlock can be provided to disable the vehicle. Such interlock may be based on a protective door over the charging receptacle being open or detection that a cord set is plugged in. However, in the event that the vehicle is in an activated state, the interlock is prevented from disabling the vehicle according to an embodiment of the disclosure. That is, undesirable disabling of the vehicle is prevented when either there is no indication of a cord set being coupled to the vehicle or the vehicle is in an activated state.

15 Claims, 2 Drawing Sheets

(56) References Cited

U.S. PATENT DOCUMENTS

| | | |
|---|---|---|
| 2010/0320964 A1 | 12/2010 | Lathrop et al. |
| 2011/0022256 A1 | 1/2011 | Asada et al. |
| 2011/0156644 A1 | 6/2011 | Arai |
| 2011/0215758 A1 | 9/2011 | Stahlin et al. |
| 2011/0266996 A1 | 11/2011 | Sugano |

OTHER PUBLICATIONS

Search Report dated Mar. 8, 2013, for corresponding German Application 102011076451.8.

* cited by examiner

PLUG-IN ELECTRIC VEHICLE INTERLOCK

CROSS-REFERENCE TO RELATED APPLICATIONS

This application is a continuation of U.S. application Ser. No. 12/795,289 filed Jun. 7, 2010, now U.S. Pat. No. 8,346,423, the disclosure of which is incorporated in its entirety by reference herein.

TECHNICAL FIELD

The present disclosure relates to interlocks related to the charging system on electric vehicles to disable vehicle driveaway during charging.

BACKGROUND ART

Electric vehicles, which are coupled to a wall outlet to charge the battery, are sometimes provided with an interlock such that vehicle starting is prevented when the electric vehicle's cord set is plugged into the wall. As the vehicle may depend on being charged, there is a concern that the cord set and/or the vehicle would be damaged in the event of a driveaway while the cord set is attached.

The interlock may be a switch coupled to a protective door over the vehicle's receptacle. When the switch indicates that the door is open, driveaway is prevented. In another alternative, an electronic control unit (ECU) onboard the vehicle determines whether the cord set is attached and, if so, prevents driveaway.

It may be possible for a vandal, or other third party, to interfere with the vehicle's operational capability by opening the protective door or by plugging a device into the vehicle's receptacle to deceive the ECU's logic associated with the cord set. Such a situation is not only inconvenient for the vehicle operator, but could leave the vehicle operator stranded if the vehicle operator is unable to detect the issue preventing vehicle operation.

SUMMARY

To overcome at least one problem, an interlock for a plug-in vehicle includes enabling the vehicle when a negative result from a cord set indicator is detected, enabling the vehicle when a positive result from the cord set indicator is detected immediately following detection of a negative result from the cord set indicator while the vehicle is continuously activated, and disabling the vehicle when a positive result from a cord set indicator is detected while the vehicle is deactivated. In one embodiment, enabling includes allowing a powertrain of the vehicle to provide propulsion to wheels of the vehicle in response to an action of a vehicle operator to activate the vehicle. In one embodiment, an activated state of the vehicle corresponds to a state when the vehicle is in a torque-producing mode. Alternatively, the activated state includes a transmission of the vehicle being in one of a forward or reverse driving gear.

The vehicle has at least one electric motor coupled to vehicle wheels and disabling the vehicle is performed by preventing the electric motor from providing propulsive force to vehicle wheels. The vehicle may further include an internal combustion engine coupled to vehicle wheels. Disabling the vehicle may further include preventing the internal combustion engine from providing propulsive force to vehicle wheels.

The vehicle has a charging receptacle with a protective door providing access to the charging receptacle and a switch mounted proximate the protective door. The cord set indication is provided by the switch. Alternatively, the cord set indicator is based on detecting electrical properties consistent with a cord set being coupled to the receptacle on the vehicle.

An interlock for a plug-in vehicle includes a cord set indicator and an electronic control unit coupled to a powertrain of the vehicle and the cord set indicator. An interlock routine of the electronic control unit disables the powertrain when the cord set indicator indicates that a charging cord is attached to the vehicle and the vehicle is deactivated and prevents disabling of the powertrain when the vehicle is activated. The vehicle is activated when the vehicle is in a torque-producing mode such that an operator of the vehicle may selectively command propulsion at vehicle wheels without manipulation related to the cord set indicator. The interlock may also include a charging receptacle coupled to the vehicle, a charge door coupled to the vehicle and preventing access to the charging receptacle when in a closed position, and a switch coupled to the charge door and electronically coupled to the electronic control unit. A signal from the switch indicates whether the door is open or closed and the switch is the cord set indicator. In an alternative embodiment, the interlock includes a charging receptacle coupled to the vehicle and electronically coupled to the electronic control unit. The electronic control unit detects whether a plug is coupled with the charging receptacle and detection of the plug is the cord set indicator. The electronic control unit prevents disabling of the vehicle when the vehicle is presently activated regardless of a status of the cord set indicator. The interlock may further include a charging receptacle coupled to the vehicle and electronically coupled to the electronic control unit, and an operator indicator within a cabin of the vehicle. The electronic control unit turns on the operator indicator when the cord set indicator indicates that a plug is coupled to the charging receptacle.

According to an alternative embodiment, an interlock method for a plug-in vehicle includes preventing the vehicle from accessing a torque-producing mode when both a positive result from a cord set indicator is detected and the vehicle is in a deactivated state; and allowing the vehicle to access the torque-producing mode in response to one of: a negative result from a cord set indicator and the vehicle currently in an activated state. The torque-producing mode is prevented by one of disabling a powertrain of the vehicle and preventing a transmission coupled to the vehicle from accessing any forward or reverse gear. The vehicle has a receptacle adapted to accept a cord set for charging of the vehicle, the vehicle has a protective door to cover the receptacle, the vehicle has a switch proximate the protective door, and the cord set indicator is based on a signal from the switch indicating whether the protective door is open. The vehicle has a receptacle adapted to accept a cord set for charging of the vehicle and the cord set indicator is based on detecting presence of the cord set coupled to the receptacle.

The torque-producing mode is a mode in which the vehicle is capable of being propelled via commands by a vehicle operator by depressing an accelerator pedal coupled to the vehicle. According to another embodiment, the torque-producing mode is a state of the vehicle in which a vehicle operator selectively commands a powertrain of the vehicle to propel the vehicle.

DETAILED DESCRIPTION

Figure 1:
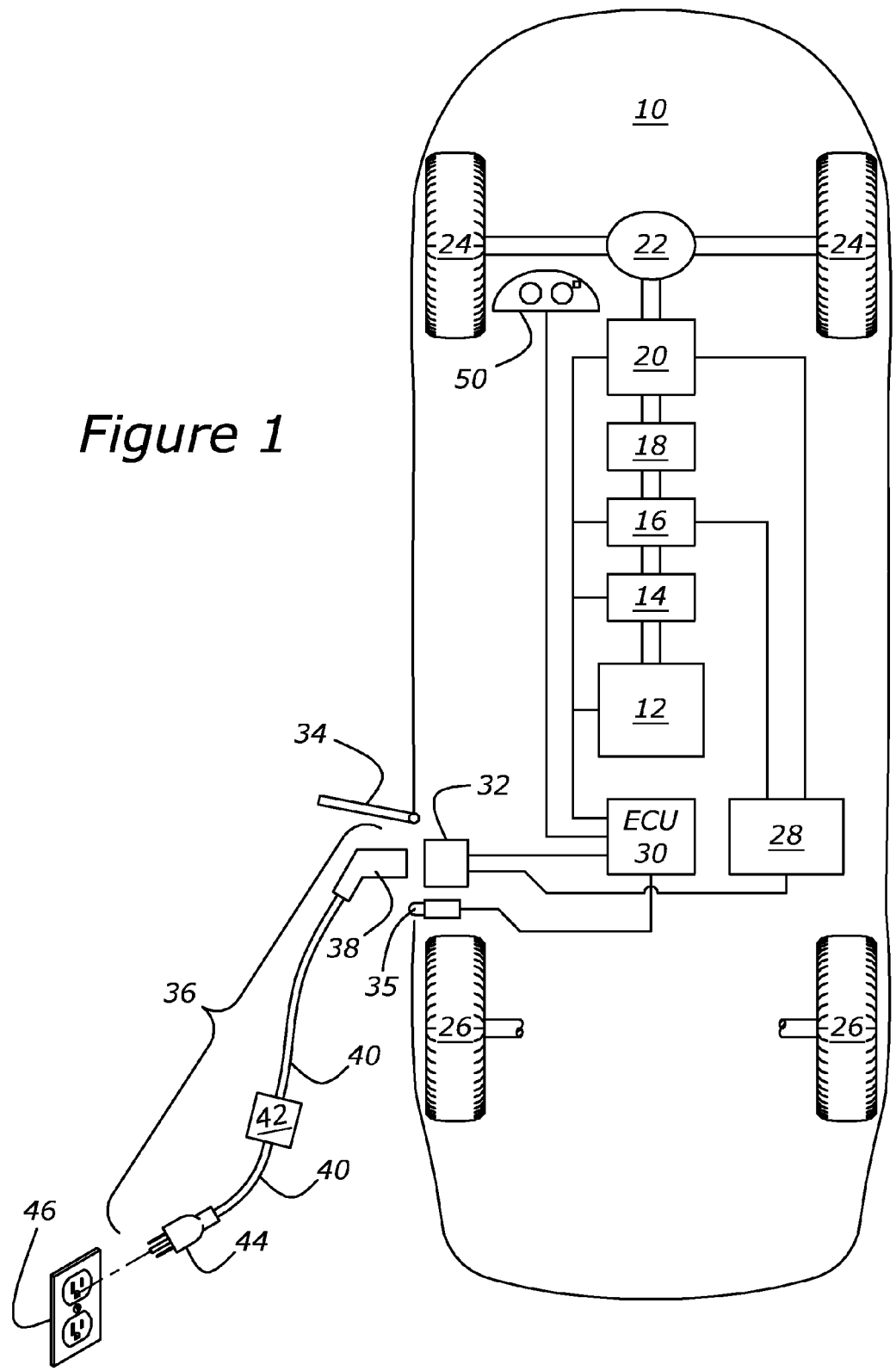
FIG. 1 is a schematic of a plug-in hybrid electric vehicle.

As those of ordinary skill in the art will understand, various features of the embodiments illustrated and described with reference to any one of the Figures may be combined with features illustrated in one or more other Figures to produce alternative embodiments that are not explicitly illustrated and described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations consistent with the present disclosure, e.g., ones in which components are arranged in a slightly different order than shown in the embodiments in the Figures. Those of ordinary skill in the art will recognize that the teachings of the present disclosure may be applied to other applications or implementations. In FIG. 1, a schematic of a vehicle is shown by way of example as a plug-in hybrid electric vehicle (HEV) 10. One type of HEV in which powertrain 11 includes: an internal combustion engine, a one-way clutch 14, a generator 16, a planetary gear set 18, and motor 20. Powertrain 11 is coupled to differential 22. Differential 22 is coupled to the axle having drive wheels 24. Vehicle 10 also has non-driven wheels 26.

The HEV in FIG. 1 has a high voltage battery 28, which is coupled to generator 16 and motor 20. Electronic control unit (ECU) 30 is coupled to engine 12, one-way clutch 14, generator 16, motor 20, and battery 28. In FIG. 1, a single ECU 30 is illustrated. However, it is common for vehicle 10 to have distributed computing involving multiple ECUs instead of a single ECU. For illustration purposes and ease of description, computing and control functionality is described in regards to a single ECU with the understanding that such functionality can be separated among multiple processors.

Vehicle 10, as a plug-in, has an electrical receptacle 32 with a protective door 34, which is shown in FIG. 1 in an open position. Vehicle 10 has a charger, which in FIG. 1 is integrated into electrical receptacle 32, but could be in a separate module in an alternative embodiment. A pin switch 35 is provided on vehicle 10 proximate protective door 34. Protective door 34 keeps away dirt, dust, and moisture from the environment when charging is not occurring. A charging cord set 36 includes: an electrical coupler 38, which couples with receptacle 32 during charging; two lengths of cable 40 with an electrical vehicle supply equipment (EVSE) 42 device in between cables 40. In some embodiments, EVSE 42 includes fuses, relays, transformers, and a circuit board with processing capability. Cord set 36 further comprises a plug 44 which can be plugged into wall outlet 46.

Vehicle 10 in FIG. 1 is a HEV; but in an alternative embodiment vehicle 10 is a battery-only electric vehicle. Furthermore, other HEV architectures are within the scope of the present disclosure.

Cord set 36 can be damaged if vehicle 10 is started up and driven away when cord set 36 is coupled to vehicle 10. To avoid such damage, an interlock system can be provided in which ECU 30 prevents powertrain 11 from driving away in response to a cord set indicator, i.e., indicating whether a cord set is coupled to the vehicle. In one embodiment, two-position pin switch 35 indicates to ECU 30 whether the door is open or closed. The door being open provides an indication that a cord set is coupled with the vehicle. In embodiments in which the door is used as the charging indicator, interlock actions are taken regardless of whether a cord set is actually coupled to the vehicle and whether or not actual charging is occurring. In some embodiments, ECU 30 provides a signal to an operator indicator 50 so that the operator of the vehicle is informed and can attend to the fault. Operator indicator 50 can provide a written, symbolic, oral, or any suitable signal to indicate a fault to the operator of vehicle 10.

In an alternative embodiment, ECU 30 detects whether an electrical coupler is coupled with receptacle 32. This can be accomplished via a switch proximate receptacle 32, similar to pin switch 35, which electrical coupler 38 actuates when installed. In another embodiment, ECU 30 detects whether a cord set is coupled with receptacle 32 based on electrical properties. Depression of a pin associated with receptacle 32 or electrical properties is one embodiment of a cord set indicator. As with door switch 35, a pin switch proximate receptacle 32 indicating the presence of an electrical coupler or the change in electrical properties determined can be used as a cord set indicator. An inadvertent depression of the pin or an alternative to electrical coupler 38 can be coupled with receptacle 32, either of which would provide a positive result in the cord set indictor whether or not a cord set is actually coupled to the vehicle. An alternative to electric coupler 38 could include an element having one or more components that mate with receptacle 32 and mimic the electrical properties of the cord set 36 so that ECU 30 detects the presence of a cord set. For example, the resistance characteristics of cord set 36 can be matched by the element.

As door 34 and receptacle 32 are external to vehicle 10, a prankster can disable the vehicle by opening door 34 in embodiments in which door 34 provides the cord set indicator signal or by popping in an electric plug containing some circuitry to provide a cord set indication. Or, an innocent third party can inadvertently disable the vehicle, e.g., by forgetting to close door 34 when disconnecting cord set 36 or catching door 34 on clothing causing it to open. In yet another example, a fender bender may cause protective door 34 to open and thereby disabling vehicle 10. In the event that vehicle 10 is, for example, parked in a garage, operator indicator 50 provides the operator with information to resolve the situation, which is preventing vehicle 10 from driving away. However, such an interlock presents a problem when vehicle 10 is activated. For example, if vehicle 10 is stopped at a traffic light and a pedestrian bumps the car causing protective door 34 to open, vehicle 10 becomes disabled, which at a minimum is an inconvenience to the vehicle operator. It is desirable to prevent the interlock from disabling vehicle 10 when it is already activated, i.e., a condition under which a cord set is exceedingly unlikely to be plugged in. If the cord set indicator is providing a positive result, under such circumstances, it is more than likely providing a false indication that a cord set is actually coupled to vehicle 10. Instead it can be providing a positive result by the door being open or a dummy plug coupled to the vehicle receptacle, i.e., a false positive.

Figure 2:
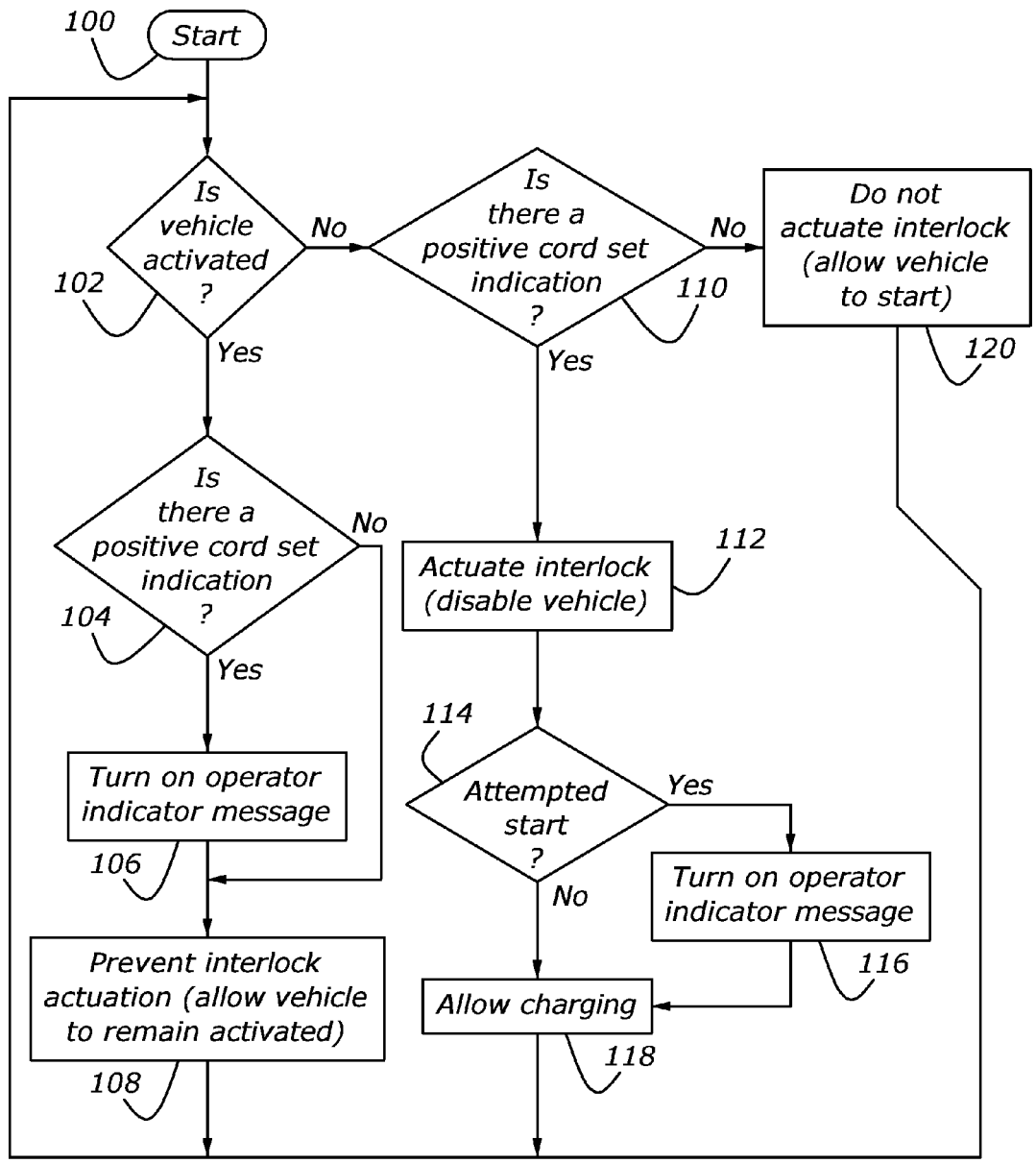
FIG. 2 is a flowchart depicting one embodiment of the present disclosure.

In FIG. 2, a flowchart, according to one embodiment of the disclosure, starts in 100. In block 102, it is determined whether the vehicle is activated. In one embodiment, an activated vehicle occurs at key-on, i.e., the operator of the vehicle has used a key of the vehicle to bring the vehicle into a state in which the vehicle could be caused to move upon accessing a gear and providing input to an accelerator pedal. Some vehicles are not provided with an ignition key, but instead are push-button started, which is allowed only when the ignition system detects a radio frequency identification device with the appropriate code within the vehicle or other suitable device and the operator has pushed a button to activate the vehicle. In such case, key-on refers to the state in which the vehicle operator could cause the vehicle to move by accessing a gear and pushing on an accelerator pedal. Such activated state is independent of whether an electric motor or an internal combustion engine associated with the vehicle is rotating. For example, neither the electric motor nor the internal combustion engine, if provided in the vehicle, may be rotating when the vehicle is stopped at a traffic light. Nevertheless, the vehicle is considered to be activated as propulsion can be requested by the operator simply by depressing the accelerator pedal (without the brake being applied). Such activated state can alternatively be called torque-producing mode or propulsion-ready mode.

Herein, the vehicle being disabled refers to the vehicle being rendered unable to propel the vehicle via normal operator actions. Normal operator actions are those which cause the vehicle to access the torque-producing mode, such as putting the transmission into a gear, releasing a brake pedal, and/or depressing an accelerator pedal. In background systems, the vehicle becomes disabled upon an interlock condition occurring and is not enabled until the interlock condition is removed. The vehicle may become enabled by the operator taking care of the situation leading to the interlock condition. However, for the purposes of this disclosure, such actions to overcome the interlock condition are not considered normal operator actions to put the vehicle in the torque-producing mode. Furthermore, such normal operator actions do not include the vehicle operator, or other actor, taking action from outside a cabin of the vehicle. Such non-normal actions occurring outside the cabin may include unplugging the cord set 36, and/or closing the protective door 34, as examples.

Referring again to FIG. 2, if a positive result in 102, control passes to 104 in which an indication of a cord set 36 coupled with receptacle 32 is detected. If such indication is found, control passes to block 106 in which a warning message is displayed on the operator indicator. Such message can be a text message, an oral message, a chime, an indicator lamp, etc. A negative result in block 104 and 106 pass control to 108 in which the interlock is prevented and the vehicle is allowed to continue to remain activated.

If a negative result in block 102, control passes to block 110, in which cord set coupling with receptacle 32 is determined. If a positive result in block 110, control passes to block 112 in which the interlock is actuated, meaning that the vehicle is disabled. In one embodiment, the vehicle is disabled by disabling the powertrain, i.e., neither the engine nor motor can be caused to rotate. In another embodiment, the powertrain may be allowed to rotate to provide secondary functions, but the vehicle is disabled by preventing taking the transmission out of park. From block 112, control passes to 114 in which it is determined whether there was an attempted start. If yes, the operator indicator message is activated in block 116 to provide the operator with information about the fault so that the operator may rectify the situation and remove the condition leading to the interlock. If a negative result in block 114, control passes to block 118 in which charging of the vehicle is allowed.

If a negative result in block 110, control passes to block 120 in which the interlock is not activated so that the vehicle will be allowed to start (enabled) when such command is given by the vehicle operator. The routine can be run successively with control passing back to block 102 from any of blocks 108, 118, and 120.

While the best mode has been described in detail, those familiar with the art will recognize various alternative designs and embodiments within the scope of the following claims. Where one or more embodiments have been described as providing advantages or being preferred over other embodiments and/or over background art in regard to one or more desired characteristics, one of ordinary skill in the art will recognize that compromises may be made among various features to achieve desired system attributes, which may depend on the specific application or implementation. These attributes include, but are not limited to: cost, strength, durability, life cycle cost, marketability, appearance, packaging, size, serviceability, weight, manufacturability, ease of assembly, etc. A suitable compromise, depending on the application, may be selected. The embodiments described as being less desirable relative to other embodiments with respect to one or more characteristics are not outside the scope of the disclosure as claimed.

What is claimed is:

1. An interlock for a plug-in vehicle, comprising:
   a cord set indicator;
   an electronic control unit coupled to a powertrain of the vehicle and the cord set indicator and configured to disable the powertrain when the cord set indicator indicates that a charging cord is attached and the vehicle is deactivated, and to prevent disabling of the powertrain after the vehicle has been activated when the cord set indicator indicates that a charging cord is attached.

2. The interlock of claim 1 wherein the vehicle being activated comprises the vehicle being in a torque-producing mode such that an operator of the vehicle may selectively command propulsion at vehicle wheels without manipulation related to the cord set indicator.

3. The interlock of claim 1, further comprising:
   a charging receptacle coupled to the vehicle;
   a charge door coupled to the vehicle and preventing access to the charging receptacle when in a closed position;
   a switch coupled to the charge door and electronically coupled to the electronic control unit wherein a signal from the switch indicates whether the door is open or closed and the switch comprises the cord set indicator.

4. The interlock of claim 1, further comprising:
   a charging receptacle coupled to the vehicle and electronically coupled to the electronic control unit wherein the electronic control unit detects whether a plug is coupled with the charging receptacle and detection of the plug comprises the cord set indicator.

5. The interlock of claim 1 wherein the electronic control unit prevents disabling of the vehicle when the vehicle is presently activated regardless of a status of the cord set indicator.

6. The interlock of claim 1, further comprising:
   a charging receptacle coupled to the vehicle and electronically coupled to the electronic control unit; and
   an operator indicator within a cabin of the vehicle wherein the operator indicator is electronically coupled to the electronic control unit wherein the electronic control unit turns on the operator indicator when the cord set indicator indicates that a plug is coupled to the charging receptacle.

7. The interlock of claim 1 wherein the vehicle comprises a hybrid electric vehicle having an internal combustion engine, a traction motor, and a traction battery.

8. The interlock of claim 1 wherein the vehicle comprises a battery-only electric vehicle with propulsion provided by at least one electric machine coupled to a traction battery.

9. A system for a vehicle having a powertrain including a traction motor coupled to a traction battery, comprising:
   an electronic control unit configured to disable the powertrain when the vehicle is deactivated and a cord set indicator indicates that a charging cord is coupled to the vehicle, and to maintain enabling of the powertrain when the cord set indicator indicates that a charging cord is coupled to the vehicle after the vehicle has been activated.

10. The system of claim 9 wherein the cord set indicator comprises a switch associated with a charging cord receptacle of the vehicle.

11. The system of claim 10 wherein the switch is triggered by operation of a cord receptacle door.

12. The system of claim 9 wherein the electronic control unit detects a false cord set indicator based on the cord set indicator changing states while the vehicle is activated.

13. The system of claim 9 further comprising:
   a charging receptacle coupled to the vehicle;
   a charging door coupled to the vehicle and selectively operable to provide access to the charging receptacle; and
   a switch coupled to the charging door and electronically coupled to the electronic control unit, wherein the cord set indicator corresponds to a signal associated with the switch.

14. The system of claim 13 wherein the electronic control unit is configured to enable the powertrain when the vehicle is activated and the cord set indicator indicates that no charging cord is coupled to the vehicle.

15. The system of claim 9 further comprising an indicator within a cabin of the vehicle in communication with the electronic control unit, wherein the electronic control unit activates the indicator within the cabin in response to disabling the powertrain.

* * * * *